June 17, 1952     E. J. COLLINS ET AL     2,600,849
SIMULATED CRANE AMUSEMENT DEVICE
Filed Aug. 20, 1948     10 Sheets-Sheet 1
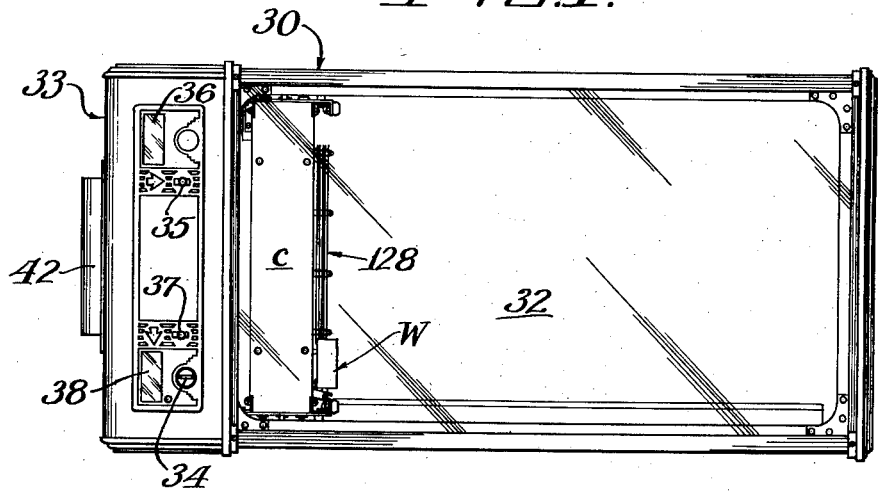
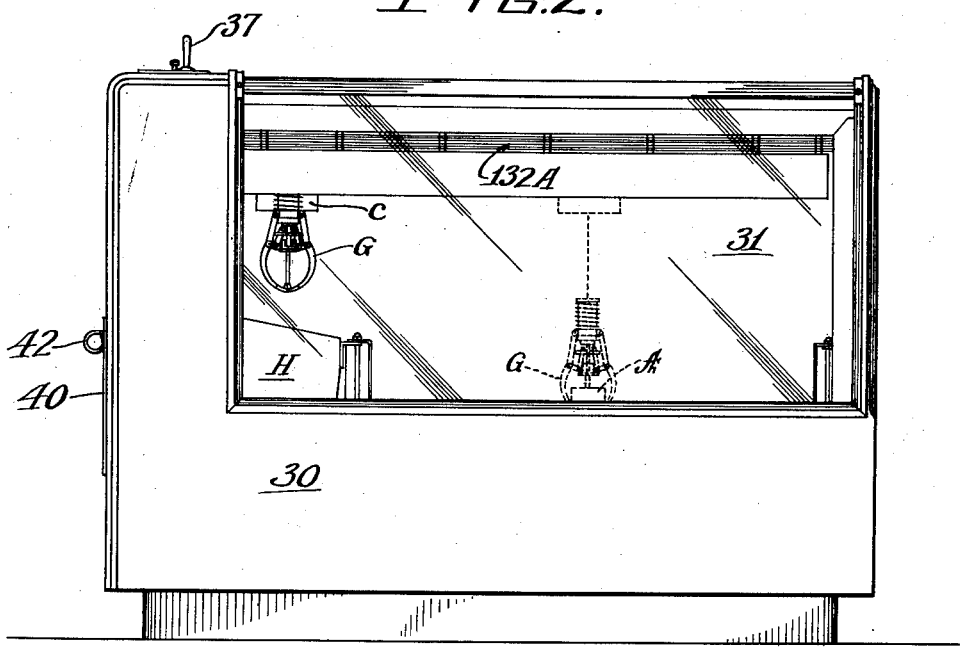
Inventors:
Edward J. Collins
Robert H. Breither
Donald Pearl

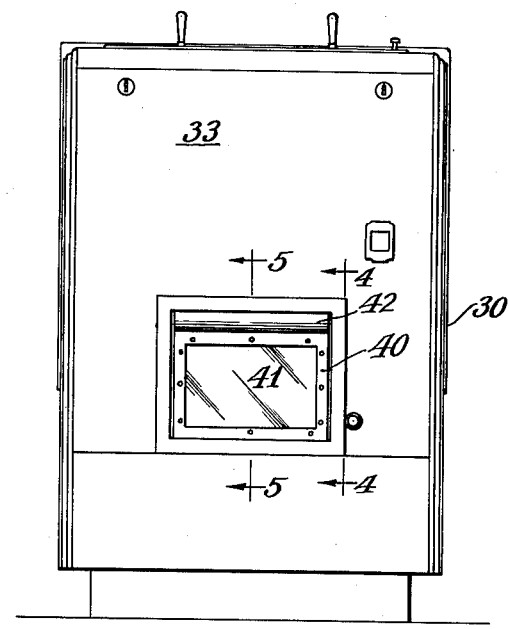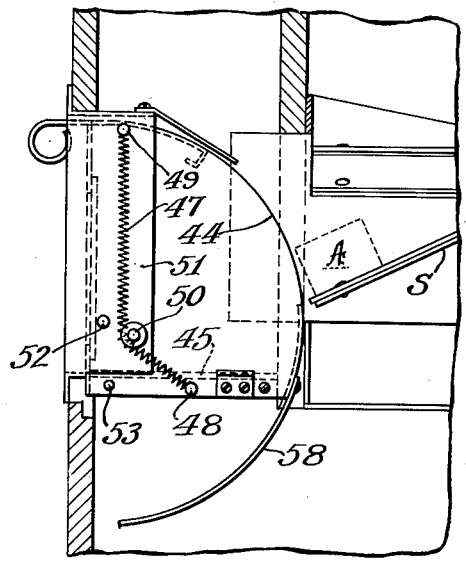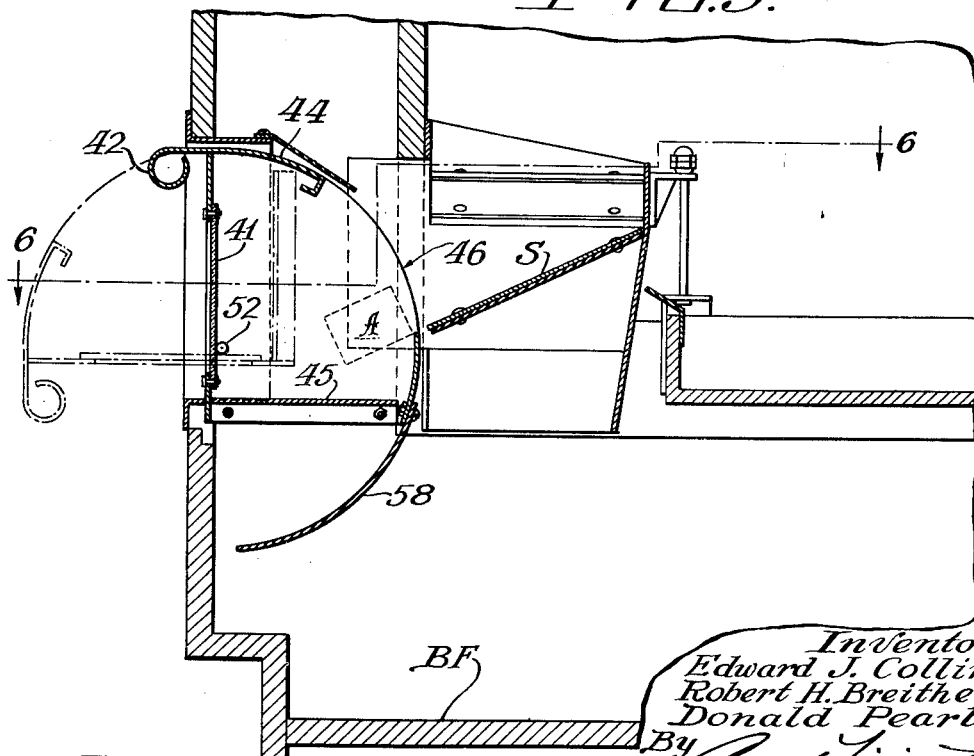

June 17, 1952 E. J. COLLINS ET AL 2,600,849
SIMULATED CRANE AMUSEMENT DEVICE
Filed Aug. 20, 1948 10 Sheets-Sheet 3
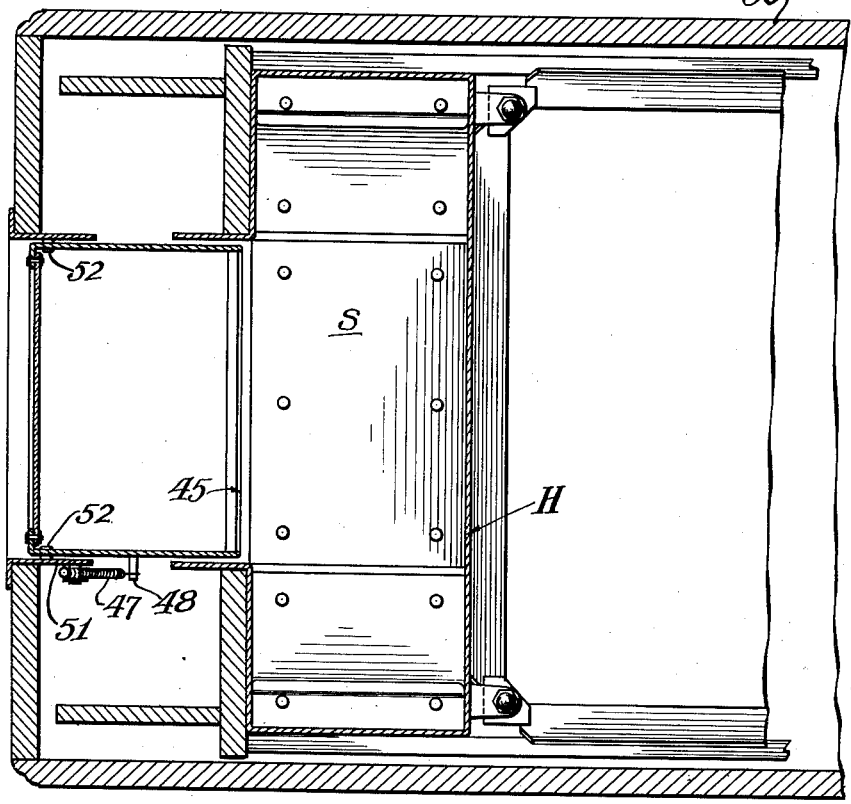
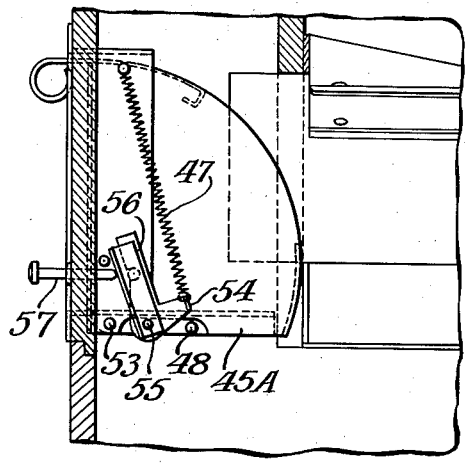
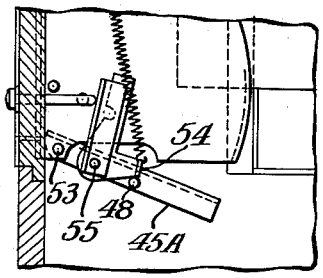
Inventors:
Edward J. Collins
Robert H. Breither
Donald Pearl
By [signature]
Atty.

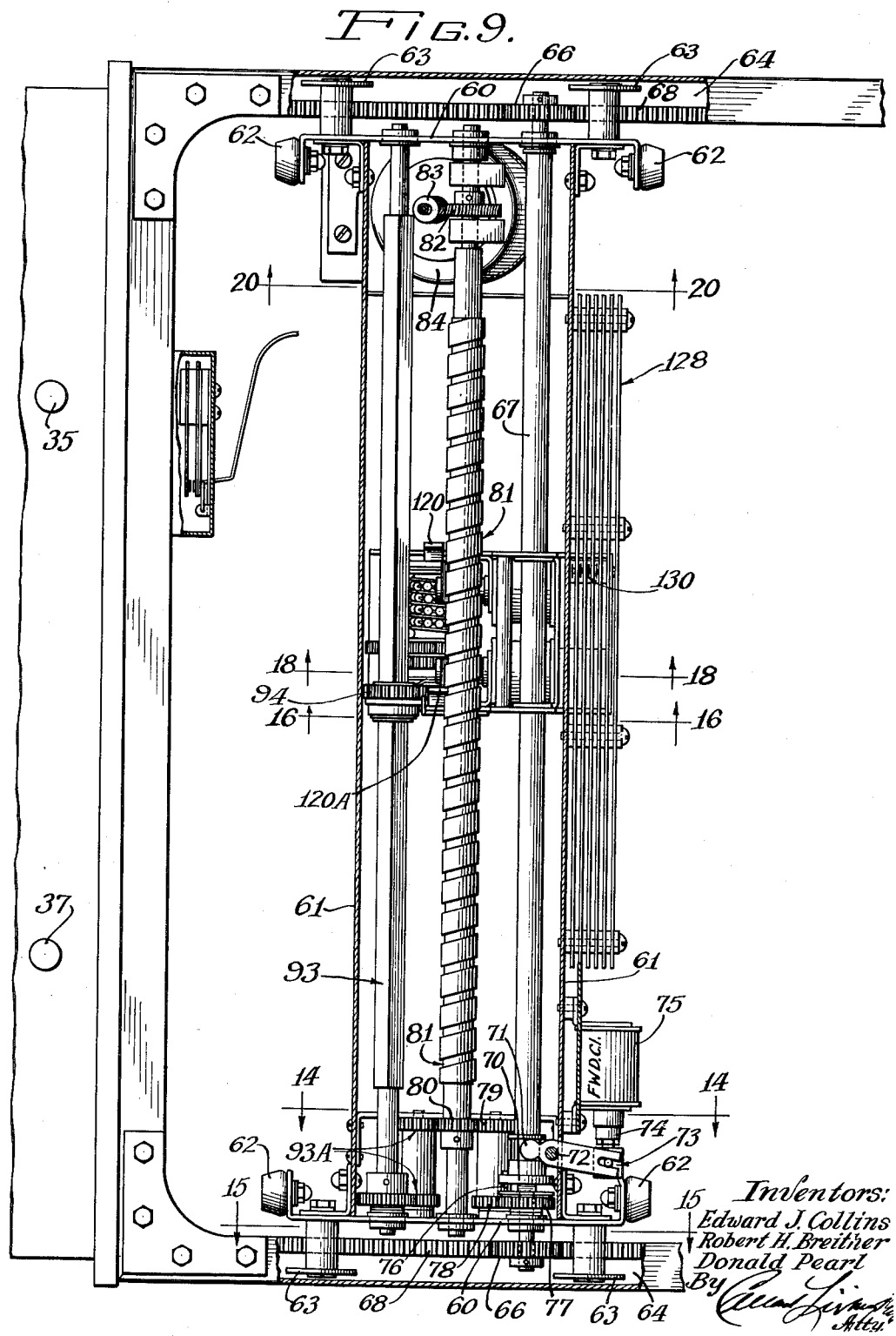

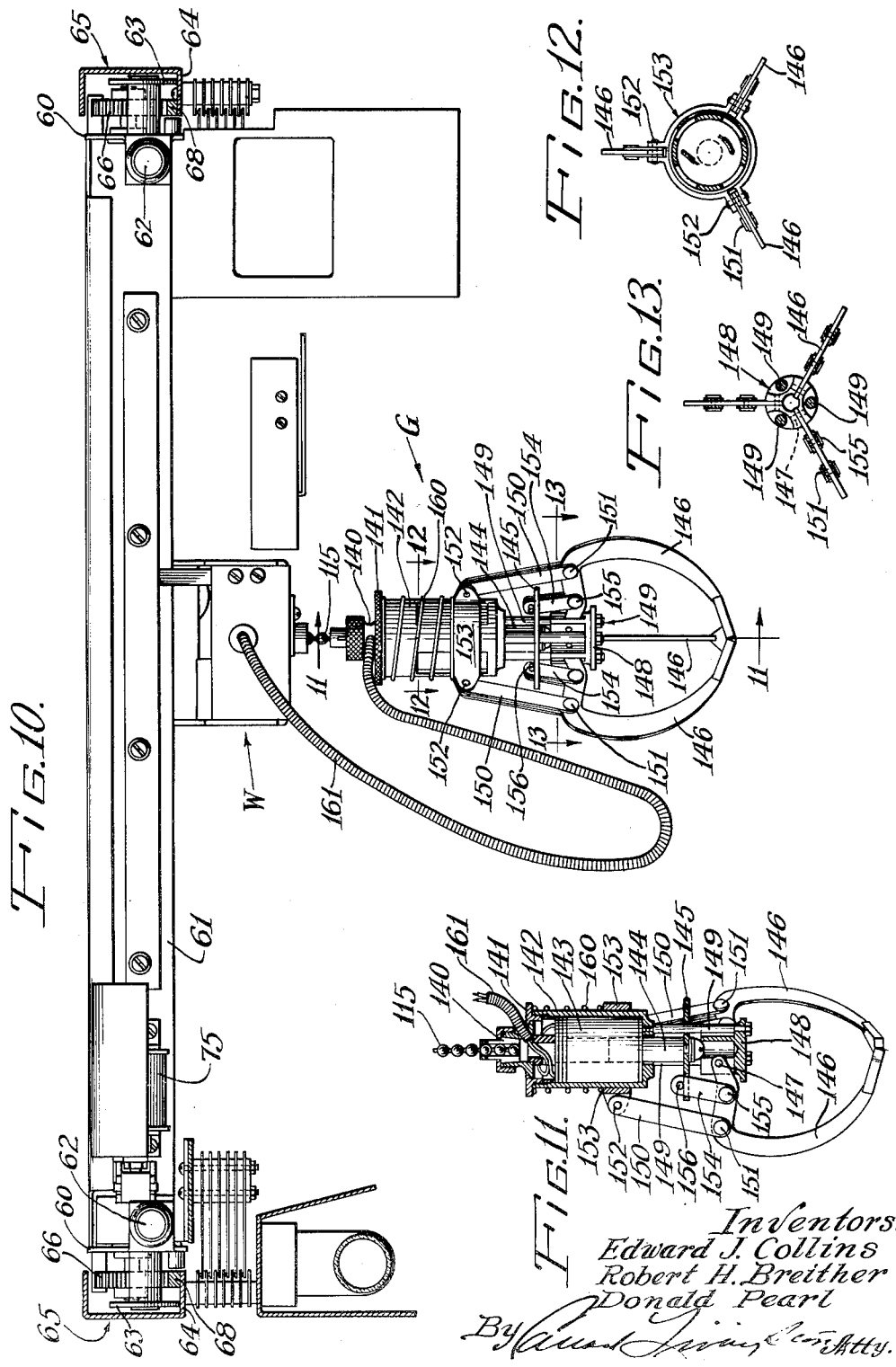

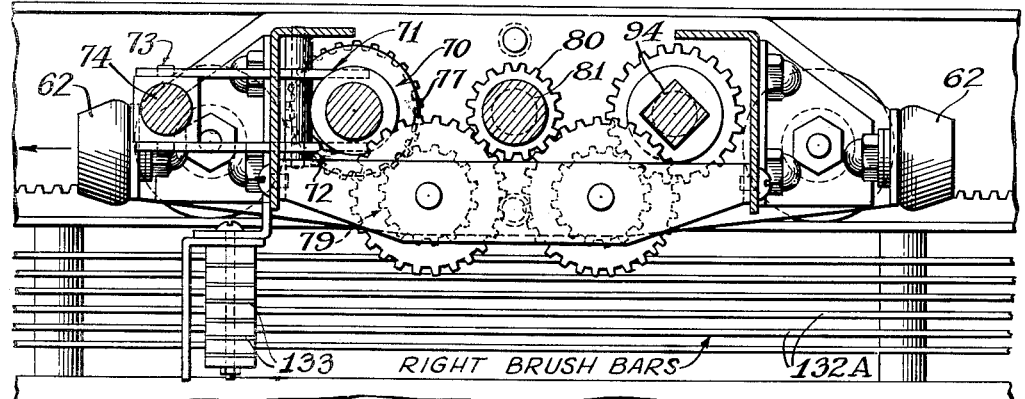
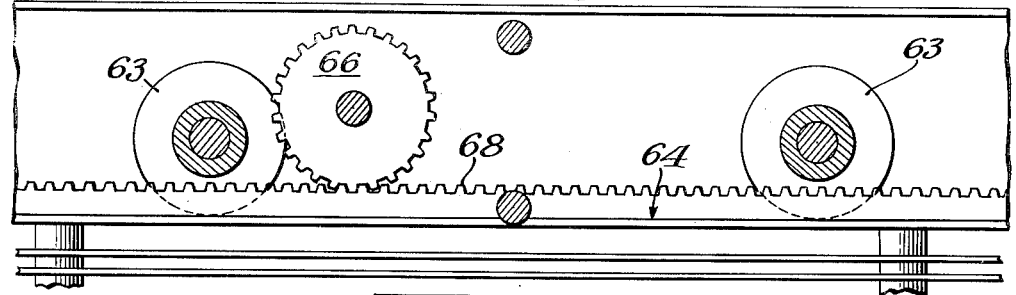
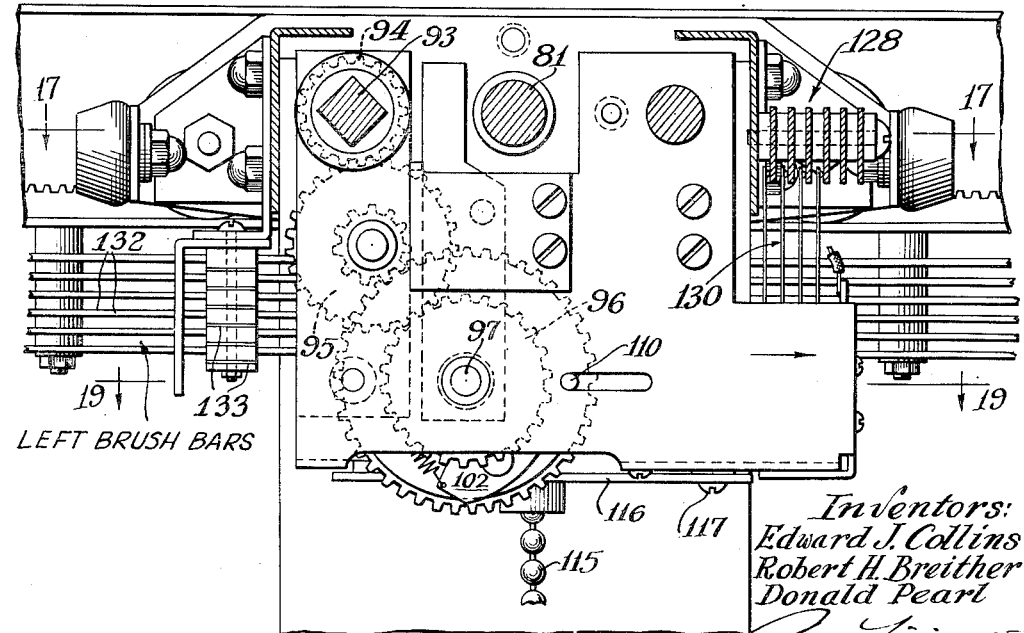

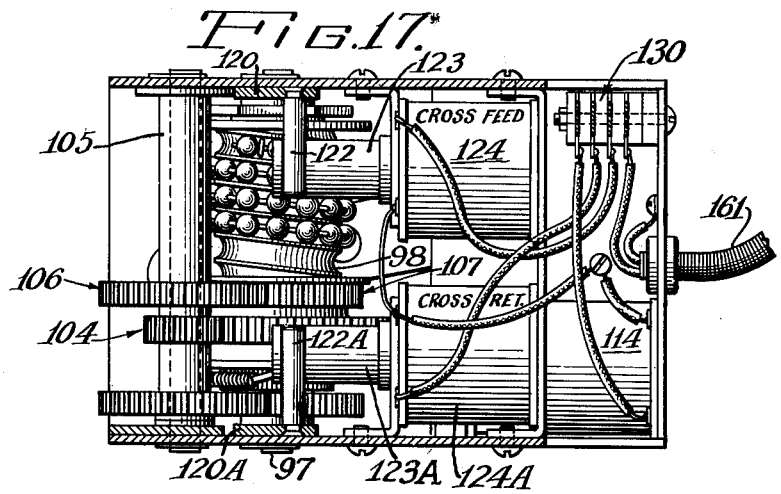
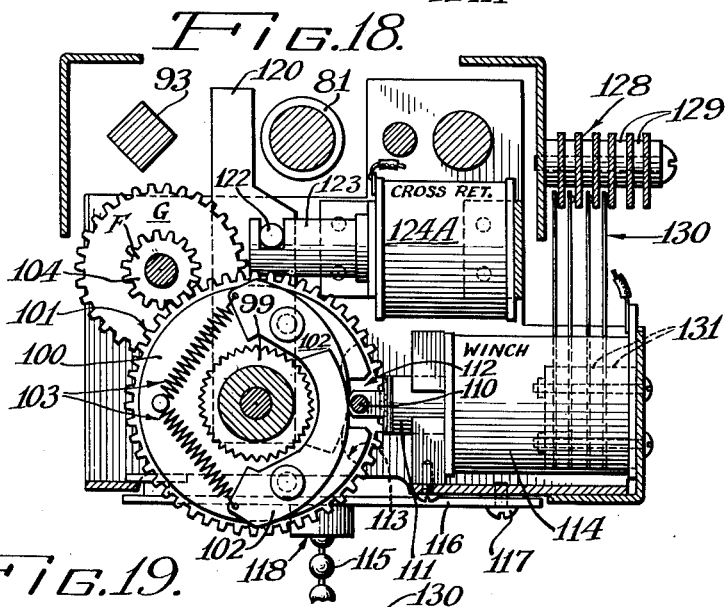
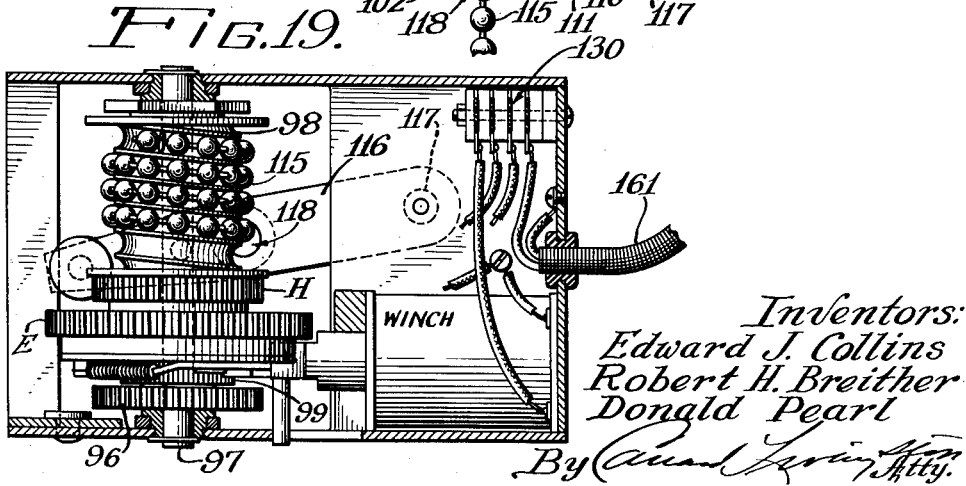

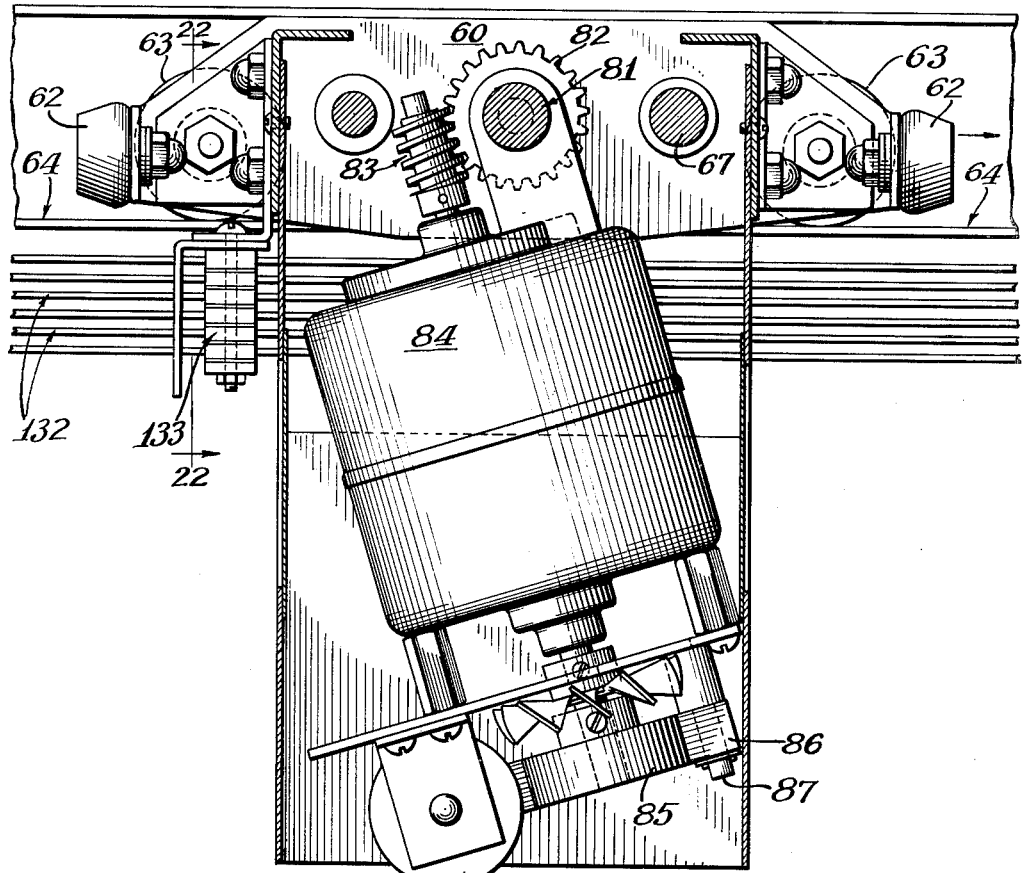
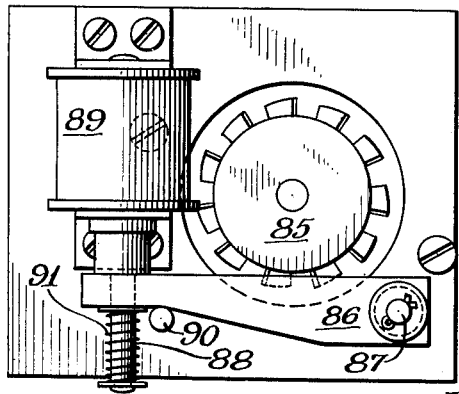
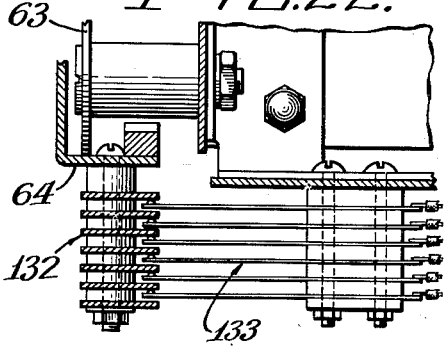

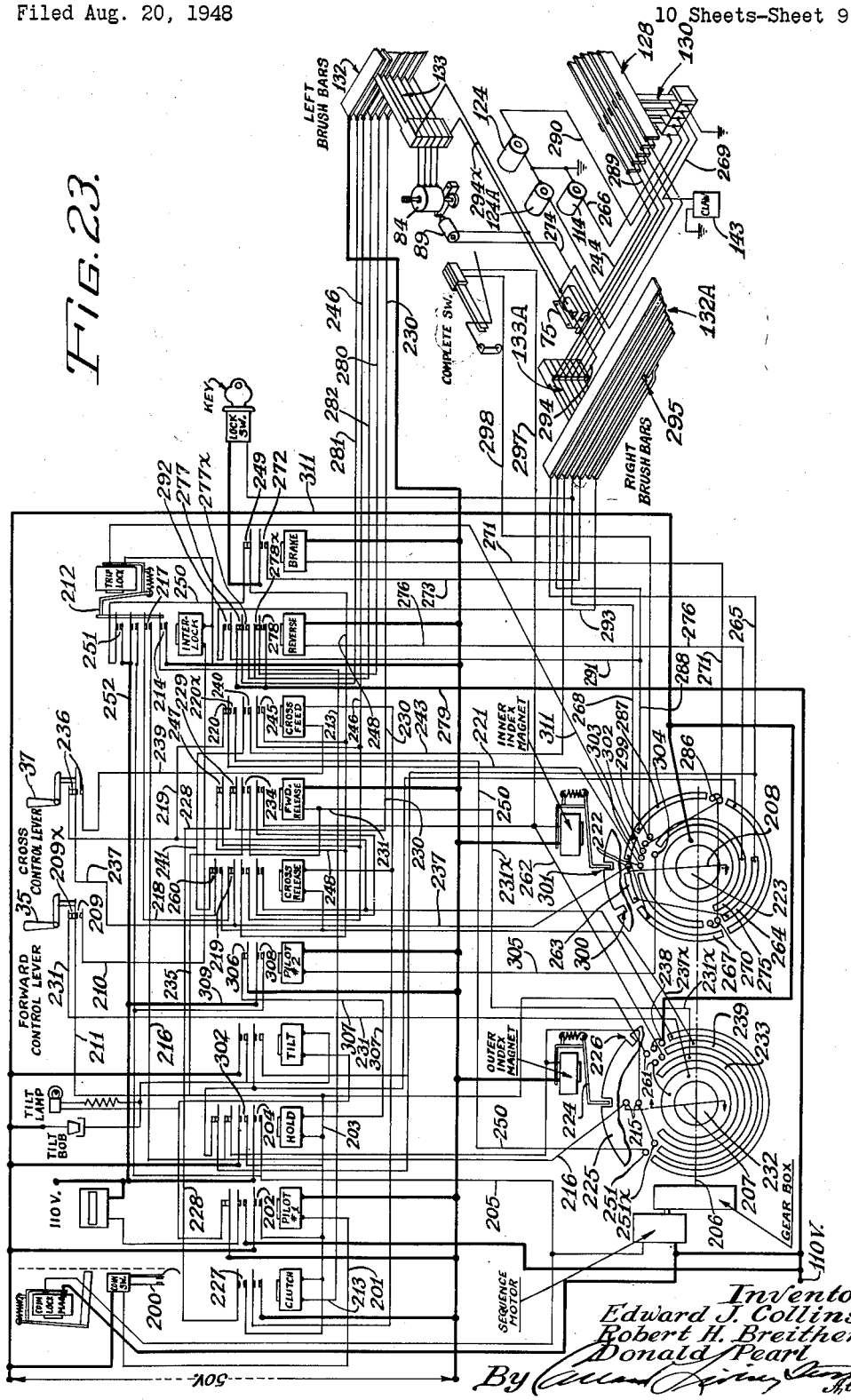

June 17, 1952     E. J. COLLINS ET AL     2,600,849
SIMULATED CRANE AMUSEMENT DEVICE
Filed Aug. 20, 1948     10 Sheets-Sheet 10
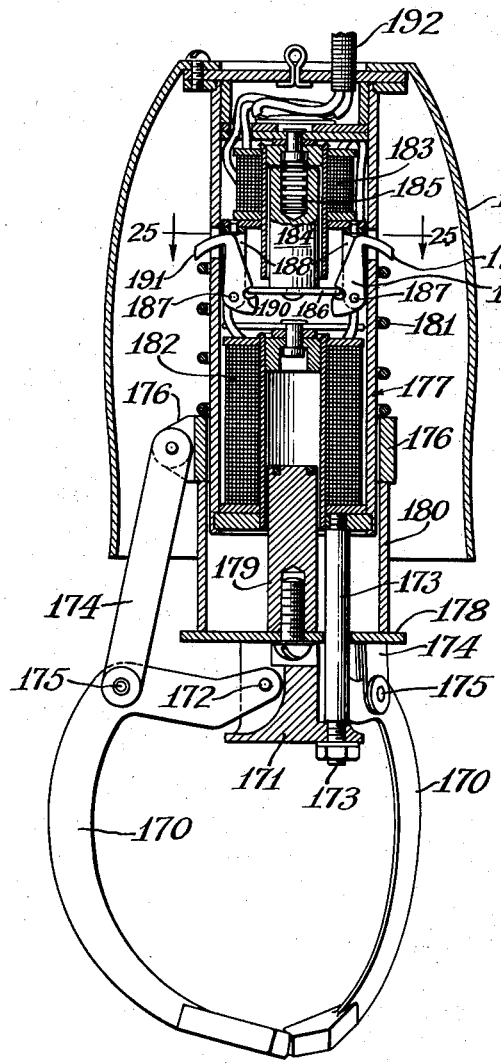
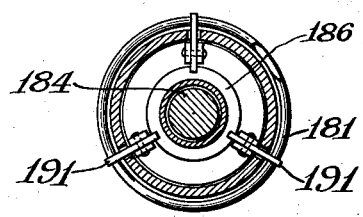
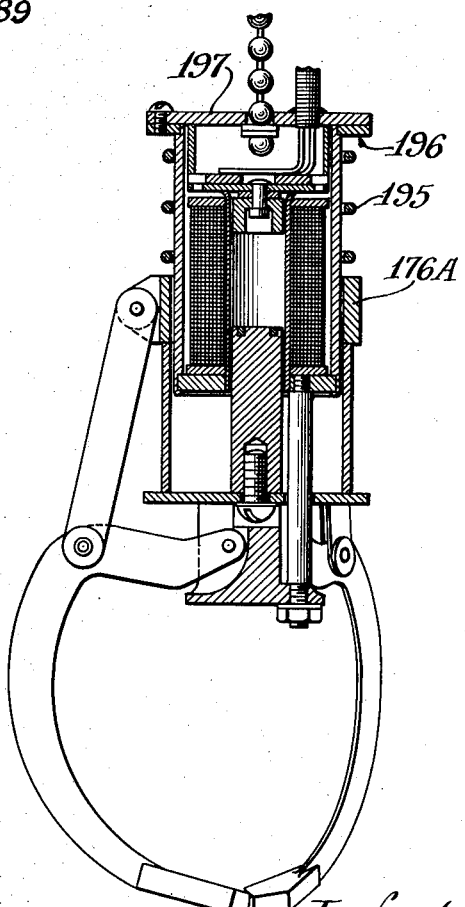
Inventors:
Edward J. Collins
Robert H. Bretther
Donald Pearl Patented June 17, 1952

2,600,849

UNITED STATES PATENT OFFICE 2,600,849

SIMULATED CRANE AMUSEMENT DEVICE

Edward J. Collins, Los Angeles, Calif., and Robert H. Breither, Mount Prospect, and Donald Pearl, Chicago, Ill., assignors to Raymond T. Moloney Application August 20, 1948, Serial No. 45,334

14 Claims. (Cl. 212—21)

This invention pertains to amusement, vending, and coin-operated skill-testing devices, and has as its principal object the provision of a machine of this class simulating many of the structural and operating features of the industrial overhead travelling crane, and in which the player or operator must exercise skill and judgment in the manipulation of certain controls in order to cause the claw of the crane to descend at a certain spot and pick up a prize object.

More particularly, the novel amusement device includes a glass-walled cabinet having prize objects distributed in some random pattern over the floor thereof, with overhead tracks on which travel a winch-carrier having a grab-claw lowered therefrom under control of the player for the purpose of seizing and delivering a desired article to the player as a result of his skillful manipulation of controls affecting certain coordinated movements of the winch-carrier, traverse movements of the winch, and lowering movements of the grab-claw.

Additional objects relate to the provision, in a machine of the class described, of an electrically operated crane and winch mechanism; a travelling electric motor drive for the crane and winch; travelling electric contact means for the motor and controls, and control circuits therefor;

Further objects relate to the provision of actuating mechanisms for the winch and crane assembly for automatically causing a traverse of the winch unit responsive to advance of the travel of the crane, and for causing a descent of the claw at various positions along the traverse; for reversing the movements of the carrier, the winch and associated instrumentalities in restoring the major mechanisms to a normal or starting position;

Still further objects relate to the provision of clutch and brake mechanisms for the crane and winch, and electromagnetic solenoid control means and circuits therefor; of electromagnetic grab-claw means for seizing prize objects; of electromagnetic regulating means in the grab-claw for governing the seizing or grabbing action thereof as a determinant in the degree of skill necessarily exercised in successfully manipulating the device; of circuit control means for regulating and cycling the several operations of the entire mechanism and associated sub-mechanisms thereof.

Additional aspects of novelty and improvement in the disclosed device relate to details of the construction and operation of the illustrative embodiments hereinafter described in view of the annexed drawings in which:

Fig. 1 is a top plan view of the game cabinet giving a top plan view of the crane or carrier;

Fig. 2 is a side elevation of the same;

Fig. 3 is a front elevation of the same;

Fig. 4 is a fragmentary vertical sectional detail of the prize-delivery door structure looking in the direction of lines 4—4 of Fig. 3;

Fig. 5 is an enlarged vertical sectional detail of the delivery door structure in operated (open) condition, looking in the direction of lines 5—5 of Fig. 3;

Fig. 6 is a horizontal sectional detail looking down on the delivery door structure in the direction of lines 6—6 of Fig. 5;

Fig. 7 and Fig. 8 are vertical sectional fragments of a modified form of delivery door structure, and are views similar to that of Fig. 4;

Fig. 9 is a horizontal section, to enlarged scale, through the crane carrier housing, showing the parts thereof in plan;

Fig. 10 is a fragmentary vertical section through the crane track showing portions of the carrier and the grab claw in elevation;

Fig. 11 is a sectional detail through one form of grab claw structure looking in the direction of lines 11—11 of Fig. 10;

Fig. 12 is a horizontal sectional detail through the grab claw looking in the direction of lines 12—12 of Fig. 10;

Fig. 13 is a horizontal sectional detail through the claw structure looking in the direction of lines 13—13 of Fig. 10;

Fig. 14 is a vertical sectional detail through the crane carrier taken in the direction of lines 14—14 of Fig. 9 and showing particularly the gear drive for the traverse worm;

Fig. 15 is another vertical sectional detail through the crane carrier taken in the direction of lines 15—15 of Fig. 9 and showing the gear drive for travelling the carrier forward and back;

Fig. 16 is another vertical sectional detail through the carrier structure showing the winch unit thereof partially in elevation and partially in section, looking in the direction of lines 16—16 of Fig. 9;

Fig. 17 is a horizontal section detail through the winch unit of the carrier at the level of lines 17—17 of Fig. 16;

Fig. 18 is a vertical sectional detail through the winch unit looking into the clutch means thereof at the position of lines 18—18 of Fig. 9;

Fig. 19 is another horizontal section through the winch unit at the level of lines 19—19 of Fig. 16.

Fig. 20 is a vertical sectional detail through the crane carrier structure looking in the direction of lines 20—20 of Fig. 9 and showing the motor drive and brake unit;

Fig. 21 is substantially a bottom plan view of the motor unit of Fig. 20 looking up toward the brake unit;

Fig. 22 is a vertical sectional detail in the direction of lines 22—22 of Fig. 20 showing the travelling contact and rail means at one side of the carrier;

Fig. 23 is a skeletonized circuit diagram;

Fig. 24 is a vertical section through a modified form of grab claw including electromagnetic regulating means therefor;

Fig. 25 is a horizontal sectional detail looking in the direction of lines 25—25 of Fig. 24;

Fig. 26 is a sectional view of a modification of the claw structure of Fig. 24;
the claw structure of Fig. 24.

Generalized structure and operation

In Figs. 1 and 2 are shown respectively the top and side views of a coin-controlled variety of the novel crane machine, wherein the cabinet 30 is provided with glass sidewall sections 31 and a glass top section 32.

At the top of the front pedestal 33 is a player's control panel including a coin-deposit opening 34, and advance control switch lever 35 and indicator light panel 36 therefor, and a traverse control switch lever 37 and indicator light panel 38 therefor.

As in Fig. 3, at the front of said pedestal 33 is an outwardly rockable article or prize-delivery bin 40 provided with a glass window portion 41 and a handle portion 42.

The normal starting position of the crane carrier C is toward the front or pedestal end of the machine, as in Fig. 2; when a player has deposited a proper coin, the machine is automatically conditioned for a cycle of play, and the player may actuate the advance or forward lever 35 to cause the crane carrier C to move forward, toward the right, Fig. 2, from the said starting position; release of said lever 35 will arrest the advance of the carrier at once, and the machine is in condition for operation of the traverse lever 37, operation of which will cause the winch (later described and designated) W to travel crosswise of the machine from its normal starting position (at the lower left of Fig. 1) until the player judges that the grab-claw G is appropriately aligned with a desired prize article A, so that when lever 37 is released, the claw may automatically descend and open to grapple the article A in the manner illustrated by the dotted-line position of the claw G' in Fig. 2.

After the claw has descended, the cycling controls of the machine will cause the winch to wind in the claw, which will have automatically closed upon and seized the article if it has been skillfully located by the player, whereupon the crane carrier will return to normal starting position and automatically release or dump the seized article upon reaching said position.

The released article A (Fig. 2) will gravitate into a discharge hopper H and thence down an apron or slide S (Fig. 4) to rest against the solid portion of an arcuate bin closure 44 until the player rocks the closure into the dotted-line position of Fig. 5 to permit said article to gravitate farther onto the delivery shelf 45 by passage through an open portion 46 in the closure or gate. A spring 47 is anchored on the shelf as at 48, and connected to the closure as at 49, and the effort of this spring is dampened somewhat by bending around a pin 50 on a bracket portion 51 of the closure, into which the pivot pin 52 is projected (see also Fig. 6).

A modified form of delivery closure means is shown in Figs. 7 and 8, wherein the floor or shelf 45A for the closure is pivoted as at 53 (which construction is present also in Fig. 4), but the lower end of the spring 47, instead of being anchored to pin 48, is attached to an arm 54 of an angle bracket pivoted on the floor as at 55 and having another offset arm 56 which is engaged by the inner end of a plunger 57 to rock said bracket until the arm 54 engages pin 48 and thereafter pivots the floor or shelf into the position shown in Fig. 8.

The latter modified bin structure permits the player or the proprietor to return the prize article into the machine without removal therefrom and without opening the bin or closure means 42—44, since the article then simply gravitates off the tilted floor 45A onto the bottom floor BF of the cabinet.

When said modified bin structure is used, the lower shield portion 58 (Figs. 4 and 5) is removed.

Crane carrier structure

The crane or carrier generally indicated at C in Figs. 1 and 2, is shown in section in Fig. 9 and includes opposite side plates 60 joined by cross plates 61; the side plates have offset edges to which are attached resilient bumper members 62. Also journaled in these side plates are carrier wheel discs 63 riding on track surfaces 64 in opposite side channels 65 supported beneath the glass top to extend lengthwise of the machine; this construction is shown to particular advantage in the vertical section of Fig. 10.

The travel or advance of the crane is effected, as in Figs. 9 and 10, through a pair of driving gears 66 at the opposite side plates on a cross shaft 67 journaled therein, and these gears ride in respective gear racks 68 secured on the channel track surfaces 64. This gear and wheel disc structure is illustrated particularly in Fig. 15.

Travel shaft 67 is driven from the carrier power plant or motor unit, to be described, through the agency of clutch means including a clutch disc 70 (Figs. 9 and 14) slidable on said shaft by means of a clutch yoke 71 pivoted at 72 through a pin and slot connection 73 with the armature 74 of a travel-clutch solenoid 75, energization of which will rock the clutch yoke 71 anticlockwise in Fig. 9 to thrust the clutch-disc pin 76 into driving engagement with driving pinion 77 normally idling on a spindle portion of shaft 67.

The driving pinion 77 is in turn driven through intermediate idling pinions 78 and 79, the latter meshing with pinion 80 on the main cross worm shaft 81 journaled in the side plates of the carrier. Fast on said worm shaft, at its opposite end, is a worm gear 82 driven by worm 83 on the main power plant motor 84, this arrangement being shown to particular advantage in Fig. 20.

Brake means for the motor 84 is shown in Figs. 20 and 21, and includes a brake drum 85 on the motor shaft, a brake arm 86 pivoted at 87 with its opposite end slidable on stem 88 of the plunger of an operating solenoid 89. The brake arm normally rests against stop pin 90; and a buffer spring 91 on stem 88 provides yieldable braking contact for the arm against the drum. Thus, the motor is adapted to be quickly stopped for arresting the several operations which it powers.

Driving power for the winch is derived from said main power plant or motor 84 through a countershaft 93 journaled in the side plates of the carrier and having thereon a travelling pinion 94 keyed thereto by reason of the square section of said countershaft, as illustrated in Figs. 9, 14, 16, said pinion meshing (Fig. 16) with gear 95, which in turn meshes with gear 96 on winch shaft 97 (on which the spirally grooved winch or chain drum 98 is free).

As in Fig. 19, the driven gear 96, floating on shaft 97, has fixed therewith a ratchet gear 99, seen also in Fig. 18; and adjacent this gear is a clutch disc 100 secured to a large gear 101.

Pivoted on the clutch disc are clutch pawls 102 normally urged by springs 103 into engagement with the ratchet gear 99 so as to cause the clutch disc to rotate with the driven gear 96 in the train of three gears driven from the countershaft.

The large gear 101 fixed to the clutch disc in turn meshes (Fig. 18) with a small intermediate pinion 104 on a small countershaft 105 (Fig. 17) in the winch, so as to drive the winch drum through reduction gears 106 and 107, the latter being fast with the winch drum 98.

The gear ratio is chosen so that for one revolution of the clutch disc 100 and its gear 101, the winch drum will make four revolutions, which is calculated to lower and raise the claw in its full operating cycle.

The winch clutch is normally disengaged (Fig. 18) by reason of the action of a pin 110 on clutch solenoid plunger 111 (urged outwardly by spring means not seen) pressing against the free ends of the clutch pawls 102 into a slot 112 on the clutch disc and a corresponding slot 113 on the gear 101.

When the clutch solenoid coil 114 is energized, pin 110 is withdrawn momentarily from said slots long enough to permit the clutch pawls 102 to grab the ratchet gear and start the clutch disc rotating, and thereafter, for the remainder of the revolution the solenoid pin 110 rides on the periphery of the clutch disc until the slots 112 and 113 are presented again, permitting the pin to press inwardly against the ends of the clutch pawls and disengage them from the driving ratchet; such a revolution of the clutch disc and its gear 101 would correspond to four revolutions of the winch drum, and hence to a lowering or raising of the claw, depending on which way the driving motor were going.

The ball chain 115 (Fig. 19) wound on the winch drum is guided by an arm 116 pivoted at 117 and having a paying hole 118; this tends to keep the chain from jumping the drum.

Countershaft 93 is rotated constantly, while the motor is running, through counter gears (Fig. 9) 93A meshing with the pinion 80 on the main worm shaft.

Traverse of the winch carriage is effected, as shown in Fig. 9, by means of a pair of rider levers or worm riders 120, 120A, pivoted (Fig. 17) at their lower ends on the winch carriage and drum shaft, each said rider levers having a pin 122 or 122A engaged with the plunger 123 or 123A of a corresponding operating solenoid 124 or 124A.

Thus, energization of either of the traverse solenoids 124 or 124A will cause the corresponding worm rider lever 120 or 120A to be attracted against the main worm 81, with a resultant movement of the winch carriage across the range of its travel, the direction depending upon the direction of rotation of the main motor 84.

When the winch carriage reaches the limit of travel in either direction, the worm rider lever 120 or 120A responsible for the driving control will ride off the worm 81 and the carriage will stop; and it will be clear that in order to reverse the travel of the carriage, it will be necessary to reverse the motor and also to energize the other traverse solenoid so that the other worm rider lever can engage the worm, the first lever having ridden off the worm, at the time the carriage stops.

As shown in Figs. 9 and 18 particularly, electrical connections for the several control solenoids on the winch carriage and carrier are effected through the means of conductive rails 128 and wiper contacts 130; the rails 128 are preferably of brass and are spaced in parallelism by insulating washers 129, while the corresponding wipers are similarly spaced by insulation 131. A similar contact rail and wiper structure, shown in Figs. 2, 20 and 22, is provided for the travel or lengthwise movement of the carrier, and includes right and left brush bars or rails 132 (Fig. 20) and 132A (Fig. 14 with corresponding wiper assemblies 133 (Fig. 20) and 133A (Fig. 19). Electrical connections from the source of power and control relay system are effected variously through said rail and wiper contact means, so that the crane carrier and winch carriage and associated electrical parts may be moved freely in travelling and traverse movements.

*Grapple or claw*

The form of grapple or claw shown in Fig. 10 is suspended from the winch structure, generally indicated at W, at the end of the ball chain 115 by means of a collet 140 (Fig. 11 also) on a top plate 141 of a solenoid shell 142, within which is a solenoid coil 143 provided with a plunger 144 terminating at its lower end in a movable annulus 145.

Grapple arms 146 are pivotally attached as at 147 to a stationary plug 148 suspended from the solenoid shell by tie rods 149. Guide links 150 are pivotally attached to the bights of the claws as at 151, and as at 152 to a sliding guide ring 153.

Operating links 154 are pivotally connected to the claw arms as at 155, Figs. 10 and 11, and also to the movable annulus 145, as at 156.

When the solenoid 143 is energized, plunger 144 is raised carrying annulus 145 with it, which lifts the operating links 154 upwardly, pivoting the claw arms at 147 to open the claws, the motion being stabilized by the guide links 150 and the guide ring 153 on the shell. The weight of the claw structure and plunger is adequate to restore the claws when the current is cut off; however, there is additionally provided a buffer and closure spring 160 on the outside of the shell above the guide ring 153, such that the latter, in rising, compresses said spring, assuring positive closure on de-energization of the solenoid, electrical circuit connection to which is completed from the winch carriage by a flexible cable 161 terminating (Fig. 17) in the carriage at wiper assembly 130.

The grappling action of the claws is somewhat dependent upon the tension and action of the shell spring 160, and in the modified form of claw shown in Fig. 24, there is provided an electromagnetic control for said action, the general structure being similar to that described in view of Fig. 10, but differing in that the claw arms 170 are pivoted to plug 171 as at 172, and the plug is fixed on tie rods 173, there being no operating links such as links 154 of Fig. 10.

Combination guide and operating links are provided by arms 174 pivoted to the claw arms as at 175 and to a guide ring 176 slidable on the shell 177. A moving annulus 178 is secured to the solenoid plunger 179 which is also provided with a tubular shell 180 telescoping on the solenoid shell 177 and bearing up against the ring 176 when the solenoid is energized, this action being modified, optionally, by reason of the shell spring 181, provided certain spring stops are in position.

Within the solenoid shell for the main solenoid 182 is a spring solenoid 183 having plunger 184 working against spring 185 and provided with a moving annulus 186. Pivoted as at 187 to depending legs 188 are spring stop arms 189 notched as at 190 to engage the annulus and be pivoted by movements of the latter so as to retract and project lugs 191 from the body of the shell into and out of the path of the spring 181.

When the stop lugs are projecting (as when the spring solenoid is energized) spring 181 bears against the lugs 191 and stiffens the action of the claws; but when the spring solenoid is not energized, lugs 191 are withdrawn and the main spring 181 is ineffective, thus easing the action of the claws.

Circuit connections for the two solenoids 182 and 183 are carried through a flexible cable 192 to the winch carriage. Shield means in the form of a bell 194 secured on the top plate of the main shell conceals and protects the spring 181 and control means 191 therefor.

The form of claw structure of Figs. 24 and 25, less the optional spring tension control means, is shown in section in Fig. 26 with a constantly acting buffer and loading spring 195 engaged by the sliding ring 176A and pressed upwardly against the rim 196 of the main shell cap plate 197. Thus, in the forms of claw shown in Figs. 10 and 26, the spring loading is constant, while in the form of Fig. 24, the spring loading is controllable by electromagnetic means.

Control circuit and operation

Referring to Fig. 23 and assuming the device to be arranged for coin operation, the player deposits a coin in the opening 34 (Fig. 1) closing coin switch 200, which pulses the pilot relay #1 via conductor 201, it being observed in this drawing that heavy lines are used to designate most of the direct terminal connections to the power source for purposes of simplifying the description, it being noted also that there are two power sources, one at 50 volts and the other at 110 volts, this being merely a safety feature, so that no distinction will be made in the description between said sources.

As a result of the operation of the pilot relay #1, the hold relay pulls up via pilot contacts 202 and conductor 203 from the pilot relay, whereupon the hold relay immediately locks-in its own holding circuit at its contacts 302, and the sequence switch motor starts via contacts 204, on the hold relay, and conductor 205, so that shaft 206, driven through a gear box by the sequence motor, tends to rotate the two sequence switch wiper contact arms 207 and 208 through a conventional friction slip-clutch (not shown), this action however being restrained by indexing pawl means such as the armature pawl 224 engaged in the first notch in disc 225.

Assuming now that the player wishes to start the crane on its advancing or forward travel, he operates the forward control lever 35, thereby causing the interlock relay to pull up via forward switch contacts 209, conductor 210, whereupon this interlock relay becomes mechanically locked by the trip lock armature 212.

As a result of the operation of the interlock relay, the clutch relay is energized via conductor 213 and interlock contacts 214; also, the outer index magnet for the outer sequence switch is energized via outer sequence switch button contacts 215, conductor 216, interlock relay contacts 217, conductor 218 to cross relay contacts 219, normally closed, conductor 237, normally bridged inner sequence switch contacts 222, wiper contact 208, and the power bus ring 223.

As a result of energization as aforesaid of the outer index magnet, its armature pawl 224 is withdrawn from the holding notch on disc 225 momentarily until the index circuit at contacts 215 is broken, so that the disc 225 travels about 45° until the pawl drops into the next notch 226.

When the interlock relay pulls up as aforesaid, the motor 84 for the crane is energized via interlock contacts 251 through contacts 249 on the brake relay, contacts 247 on the forward release relay, conductor 246 to the left brush bar #3 to motor armature terminal #3, thence to brush bar #4, conductor 282 through reverse relay contacts 278 and back to brush bar #2 in the left group, through the motor field terminals #2 and #5, returning via left brush bar #5 to conductor 279 from the power circuit via closed contacts 277 on the reverse relay.

At this time, also, the crane clutch is energized via clutch contacts 227, conductor 228, forward release relay contacts 229, conductor 230 to the left brush bar #6 via conductor 294X, to the crane clutch coil 75, whereupon the mechanism heretofore described in view of the lower right-hand portion of Fig. 9 comes into play and the crane carriage begins to travel forward.

Should the player hold the forward control lever down until the crane approaches the limit of its travel forwardly, the aforesaid clutch coil circuit would be broken by reason of one of the two said brush bars (not seen) being broken before the limit is reached (similar to the break shown at 295, Fig. 23).

Assuming now that the player does not permit the crane to move the full range of its forward travel, but wishes to stop it at a desired position, he releases the forward control lever 35, thereby opening contacts 209 and closing contacts 209X, thereby energizing the forward release relay via conductor 231, outer sequence switch bus ring 232, segment 233 engaged by wiper 207, and conductor 231X; and as a result of said energization of the forward release relay, its contacts 229 open, thus opening the aforesaid circuit therethrough for the crane clutch coil 75 (via 230, 294X), and also breaking the motor circuit at its contacts 247, above described, it being noted that the forward release relay holds its own circuit now at contacts 234, conductor 235.

The player may now cause the crane to traverse the field by operating the cross control lever 37, which will close cross contacts 236, thereby applying power from the inner sequence switch bus ring 223, wiper 208, contacts 222, conductor 237, said cross contacts 236, and conductor 239 to the cross feed coil so that the cross feed relay is operated, resulting in closure of cross feed contacts 240 to apply power from hold conductor 235, normally closed cross release contacts 241, conductor 242, said contacts 240, conductor 243 to right brush bar #3, thence to cross bar #3 and conductor 244, to energize the cross feed or traverse clutch coil 124A, thereby engaging the worm clutch, as heretofore described, and causing the carriage or crane to travel crosswise, motor 84 being energized at this time through cross feed relay contacts 245, conductor 246, and brake relay contacts 249 and conductor 248.

A further incident to the operation of the cross control lever is a second pulsing of the outer index magnet and tripping of the outer sequence switch as a result of one of the cross feed relay contacts 220 making with contact 220X to complete a circuit via conductor 250, outer sequence switch contact button 251 bridged by wiper with contact 251X, conductor 261, to the outer index magnet.

If the player does not release the cross control lever 37 before the crane reaches the end of its crosswise travel, the circuit for the cross feed clutch coil 124A will be broken by the outer sequence switch, which is now slowly tolling off the time allotted to the player in which he may release the cross control lever, the timing being such that if the crane fully traverses the field and the worm pawl drives off the worm, a few seconds later the outer sequence switch wiper arm 207 will momentarily bridge power contact 238 and segment 239 near the end of its cycle, thereby energizing the cross release relay via conductor 237X, for which a holding circuit is then established at its contacts 260 with power from the hold relay via conductors 203, 235.

*Claw cycle*

As the outer sequence switch wiper nears its home position, its contact 261 is momentarily bridged with power contact 238 to pulse the inner index magnet via conductor 262, thus starting what may be considered the claw cycle, an incident of which is the application of power from bus ring 223 by wiper 208 to the first winch segment 263 (which is looped with the second winch segment 264) and thence via conductor 265 to the #1 right brush bar, and thence via the #1 cross brush bar and conductor 266 to the winch coil 114, which actuates the winch clutch mechanism of Figs. 17 and 18, causing the chain 115 to unwind and lower the claw, the operating or opening coil 143 (or 182) Fig. 11 or 24, for which is energized by application of power thereto from inner bus ring 223 by wiper 208 to the claw segment 267, conductor 268, #4 right brush bar, #4 cross brush bar, conductor 269.

After approximately four revolutions of the winch drum, the claw is fully down and ready for hoisting. When the wiper 208 contacts button 270, power is applied via conductor 271 to the brake relay, contacts 272 of which apply power via conductor 273, #5 right brush bar, and conductor 274 to brake coil 89; and brake relay contacts 249 opening also to de-energize the motor 84 during the braking.

Immediately thereafter the inner sequence switch wiper 208 applies power to the reverse segment 275 to energize the reverse relay coil via conductor 276, and thereby reverse the power connections through motor 84 to cause it to reverse direction.

The normal or forward directional energization of motor 84 is effected through the normally closed contacts 277 and 278 on the reverse relay, contacts 277 applying power via conductor 281 and the left brush bar #2 to motor terminal #2, while contacts 278 via conductors 280 and 282 and left brush bars #4 and #5, respectively, complete the normal motor circuit with terminal #3 connected to conductor 246, contacts 247, conductor 248, contacts 249 on the brake relay, conductor 250, interlock contacts 251, power line 252.

Upon pulling up of the reverse relay as aforesaid, one of the contacts 277 breaks from its normal contact and makes or closes circuit with contact 277X, while one of the contacts 278 breaks with its normal contact and makes with contact 278X, so that the power connection from lead 279, normally completed for the forward direction of motor 84 at contacts 277, is now completed at contact 278X and applied via conductor 280 and left brush bar #5 to motor terminal #5 instead of to terminal #2, reverse contact 277X now shunting motor terminals #2 and #5 via conductors 281 and 280 and left brush bar contacts #2 and #5, and the motor power circuit thereby being completed in reversing action.

Application of the brake as aforesaid is momentary while wiper 208 on the inner sequence switch passes over contacts 270 and then engages the second winch segment 264, which again energizes the winch clutch coil 114 via the circuit previously described therefor, with the difference that motor 84 is now running in reverse, so that the claw is wound in or hoisted, it being observed also that since wiper 208 is no longer on the claw segment 267, the claw will have automatically (by its described spring means) have closed upon the object sought by the player, provided his manipulation has been adequate.

After the winch has hoisted the claw, wiper 208 will transiently engage contacts 286, again completing the brake relay energizing circuit via conductor 271 and causing momentary de-energization of the motor and braking in the manner heretofore described, immediately following which, wiper 208 engages segment 287 to apply power via conductor 288 and right brush bar #2, conductor 289, cross brush contact #2, and conductor 290 to energize the cross return clutch coil 124, thereby actuating the return worm clutch means heretofore described, so that the crane carriage returns across the field.

At this time, the power circuit set up for the cross return clutch coil on segment 287, conductor 288, is also extended via conductor 291 to reverse relay contacts 292, thereby closing an energizing circuit via conductor 293, right brush bar #7, conductor 294 to the crane carriage clutch coil 75, thereby causing the crane to return to home position, since the motor 84 is at this time still running in reverse; and as the crane approaches this position, the motor circuit is broken on the #6 brush bar at 295, which is cut at this point, the rail or bar being fed from the #7 bar via contacts 292 on the reverse relay.

As the crane carriage reaches the limit of its return travel, it presses against and closes the complete switch to pulse the inner index magnet once more via conductors 297 and 298 and contact button 299 on the inner sequence switch, to which power is applied as the wiper 208 reaches the first of its stopping positions, corresponding to the disc notch 300, by reason of which the wiper is caused to make a final move into home (or starting) position corresponding to the notch 301. During this final homing rotation of the inner sequence switch wiper 208, power is first applied via button contacts 302 (looped with contacts 286) and conductor 271 to the brake relay coil, thereby opening the motor 84 power circuit at contacts 249 and applying the brake.

At this time, also, wiper 208 engages the short claw segment 303 (looped with segment 267) which again causes the claw to open as before via conductor 268 leading power to solenoid 143, whereby to release any article the claw may have seized and dropping it into the hopper H of Fig. 2.

As the inner sequence switch wiper 208 nears final position, as aforesaid, it also applies power to button contact 304 to energize the pilot relay #2 via conductor 305, which immediately breaks the power circuit for the hold relay at its contacts 306 to conductor 307; but since both of the principal (50 volt and 110 volt) master power circuits are thereby broken at hold relay contacts 204 and 302 by this action of the #2 pilot relay, the latter momentarily restores the 110 volt power circuit at its contacts 308, conductors 309, in order that the cycle may be terminated by release of the interlock relay.

Upon moving into home position, inner sequence switch wiper 208 transiently engages contact button 310 to apply power via conductor 311 to the trip lock coil and withdraw the trip lock armature 212, thereby releasing the interlock relay, following which, wiper 208 coasts to rest on starting contacts 222 corresponding to disc notch 301, with all circuits and operating instrumentalities restored to initial or starting condition in readiness for a repetition of the described operating cycle.

We claim:

1. A miniature crane including a support mounting said crane for back and forth and crosswise travel, a grab hoist on the crane, a motor on the crane, drive means for travelling the crane and driven by said motor through a clutch, electromagnetic clutch means operable to drivingly interconnect said motor, said crane drive means, and said hoist for reversible operations, a control circuit for the motor and said electromagnetic clutch means and including manual switch means operable to effect operations of the said clutch means to travel the crane in a predetermined sequence forward from a starting position and then crosswise to a desired location, and thereafter lower, open, close and hoist said grab device, restore said crane to said starting position and open said grab device.

2. Amusement and skill apparatus comprising a crane and means mounting the same for forward and traverse motion, motor means movable with the crane and drive mechanism cooperable therewith for effecting the aforesaid crane motion, a cycling and control circuit and player-operated controls therein for separately effecting and arresting forward motion of the crane from a normal starting position and for effecting desired traverse motion, a grab claw on the crane, a winch and reverse mechanism therefor on the crane for lowering and hoisting of said claw responsive to arrest of the crane in traverse motion following forward motion, circuit means and instrumentalities for opening and closing said claw during each cycle of lowering and hoisting as aforesaid, and for opening said claw responsive to movement of the crane into said normal starting position to discharge articles seized thereby, together with circuit means cooperable with said control circuit for restoring said crane to said normal starting position following each player-initiated movement thereof away from said position.

3. Amusement and skill apparatus comprising a simulated crane having back and forth and crosswise movement, circuits and instrumentalities connected for player operation initiating an operating cycle to control advance of the crane from a starting position to an advanced position and for thereafter causing crosswise travel of the crane to a crosswise location, automatic claw means positioned by the crane dependently upon movements of the latter effected by operation of the player's control as aforesaid, and control means acting automatically responsive to crosswise locating of the claw means to actuate the same in seizing an article at said location, together with circuit instrumentalities operating automatically during each said cycle to restore the crane to said starting position and to actuate the claw means to discharge a seized article.

4. In a miniature crane apparatus, in combination with a carrier mounted for travel back and forth, a winch on the carrier and movable to traverse back and forth, a motor on the carrier, a cycling control circuit and cooperating instrumentalities operable in an operating cycle to energize said motor, a main power shaft driven by said motor, electromagnetic clutch means for connecting said shaft to travel said carrier, electromagnetic clutch means including connections therefor in said circuit for actuation only following forward travel of the carrier to traverse the winch, electromagnetic clutch means operable to actuate said winch, an article seizing device operated by the aforesaid actuation of said winch, a manually operated travel switch and a manually operated traverse switch, and connections between said switches, said control circuit, and said instrumentalities, and said clutch means whereby, operation of the travel switch during any operating cycle causes said carrier to move forward at least to a limit of travel or optionally to any point short of said limit; and operation of said traverse switch during any said operating cycle causes said winch to traverse to a limit, at least, or optionally to any point short of said limit, and to effect automatically thereafter actuation of said winch for article seizure, followed by a termination of said operating cycle with return of the carrier and winch to a predetermined position.

5. In a simulated crane mechanism, a crane carrier, motor means carried by the carrier, forward drive mechanism for the carrier, electromagnetic clutch means for interconnecting the drive mechanism and motor means, a grab and winch movable crosswise on the carrier, electromagnetic clutch means on the carrier for interconnecting the motor means and winch for crosswise travel of the latter, electromagnetic clutch means on the winch for interconnecting the latter with said motor means for lowering and hoisting the grab, electromagnetic means on the grab for opening and closing same, a control circuit and selectively operable switch means connected in said circuit for actuating said motor and the several electromagnetic means in a predetermined sequence to travel the carrier and winch and actuate said grab at desired positions.

6. In a miniature crane mechanism, a travelling crane, motor means movable with the crane, a travelling winch thereon, a grab on the winch, electromechanical control instrumentalities drivingly interconnecting the motor means with said crane and winch for travel operation a cycling circuit for said instrumentalities and including selectively operable manual switches to cause travel of the crane and travel of the winch by said motor means to a location, together with sequence switch means in said circuit for automatically actuating said winch and grab following locating operation of the crane and winch as aforesaid.

7. In a miniature crane skill device, parallel gear racks, a crane carrier, rails paralleling said racks, a carrier travelling on said rails back and forth, a motor movable with said carrier, gear means driving said carrier through said racks, electrical clutch means on the carrier for drivingly interconnecting said motor and gear means, and wiper contacts and rails providing moving electrical operating connections with said motor and clutch means.

8. In a crane apparatus, a carrier travelling back and forth, a motor on the carrier, a winch movable back and forth on the carrier, a transverse worm on the carrier and rotated by said motor, a pair of worm clutches one at each transverse side of said winch and movable into and out of driving engagement with said worm to drive the winch transversely of the carrier, each worm clutch being situated to move off one end of the worm to limit transverse travel of the winch in the direction of said end, means for separately engaging and disengaging said worm clutches with said worm, and means for reversably energizing said motor, whereby to reverse travel of the winch.

9. In an electric crane device, a carrier movable to travel back and forth, an electric motor on said carrier, a cross shaft on said carrier, a pendulum bracket carrying said motor pendantly and swingably from said shaft, a pinion on the shaft and a motor worm meshed with said pinion whereby said shaft is rotated, together with means driven from said shaft for travelling said carrier.

10. The structure defined in claim 9 and further characterized by the provision of means driven from said shaft for travelling a winch, and a winch on the carrier and movable back and forth in the direction of the axis of said shaft and travelled by said last-mentioned means.

11. A simulated crane device including, in combination, a crane carriage, a traversing winch and grab on the carriage, an electric motor on the carriage, clutch drive means between the motor, the carriage, and the winch for selectively driving the same from the motor, electromechanical control means on the carriage and winch for selectively actuating said clutch drive means, and circuits and control means including a first and second pilot relay, a hold relay, a clutch relay, forward-release, cross-feed, cross-release reverse, interlock, and brake relays, a pair of sequence switches, indexing means for said sequence switches, a starting switch, and manually operated forward and cross control switches operable to effect selective operations of said clutch drive means and produce forward and traverse movements of the carriage and winch, followed by automatic article-seizing actuation of said grab following each traversing movement of the winch, and return of the carriage and winch to a starting position with article-releasing operation thereat of said grab.

12. A simulated crane skill game including a cabinet, guide means mounting a crane carrier in said cabinet for back and forth travel, a winch and grab mounted on the carrier for back and forth traverse thereon, a player-actuated control circuit including forward travel and unidirectional traverse control levers on the cabinet operable by the player to advance the carrier and traverse the winch, each respectively in one direction, from a starting position, and said circuit further including means actuated following each traverse operation by the player for actuating said grab and restoring said carrier and winch to said starting position, and thereafter opening said grab at said position.

13. A simulated crane amusement device including a support, a crane carriage mounted on the support for reverse travel, a pick-up device on the carrier and movable back and forth crosswise of the travel thereof, an electric motor and cooperating electromechanical means for drivingly interconnecting the motor with the carriage and the pick-up device for travelling the same and for actuating the pick-up device in a lowering and raising operation, a control circuit for said motor and said electromechanical means and including manual switch means for effecting selectively and in a predetermined sequence, travel movement of the carriage and pick-up device, and automatic switch means having connection with said control circuit and electromechanical means for effecting a lowering and raising operation of the pick-up device and an article pick-up operation thereof following operation of said manual switch means.

14. In an electric crane device including a carrier having forward and return movement and a winch having traversing movement, the combination of electric motor means and electrically controlled coupling means between the motor means, the carrier, and the winch for selectively effecting said movements; a control circuit for said motor and coupling means and including cycling switch means and relay means cooperable therewith and acting to determine a cyclic sequence of operations of the carrier and winch including in the order named, at least a forward movement of the carrier, a traversing operation of the winch, and an automatic return movement of the carrier in each operating cycle; together with selectively operable switch means in said control circuit and conditioned for operation thereby for actuation to initiate an operating cycle as aforesaid, and for selectively initiating in each said cycle a forward movement of the carrier and a traversing movement of the winch prior to automatic return as aforesaid.

EDWARD J. COLLINS.
ROBERT H. BREITHER.
DONALD PEARL.

REFERENCES CITED

The following references are of record in the file of this patent:

UNITED STATES PATENTS

| Number | Name | Date |
| --- | --- | --- |
| 520,798 | Morgan | June 5, 1894 |
| 724,348 | Spangler | Mar. 31, 1903 |
| 903,601 | Miller et al. | Nov. 10, 1908 |
| 1,471,094 | Bloss | Oct. 16, 1923 |
| 1,982,119 | Neumann | Nov. 27, 1934 |
| 2,041,089 | Rowe | May 19, 1936 |
| 2,254,285 | Harris et al. | Sept. 2, 1941 |
| 2,391,881 | Clay | Jan. 1, 1946 |